UNITED STATES PATENT OFFICE.

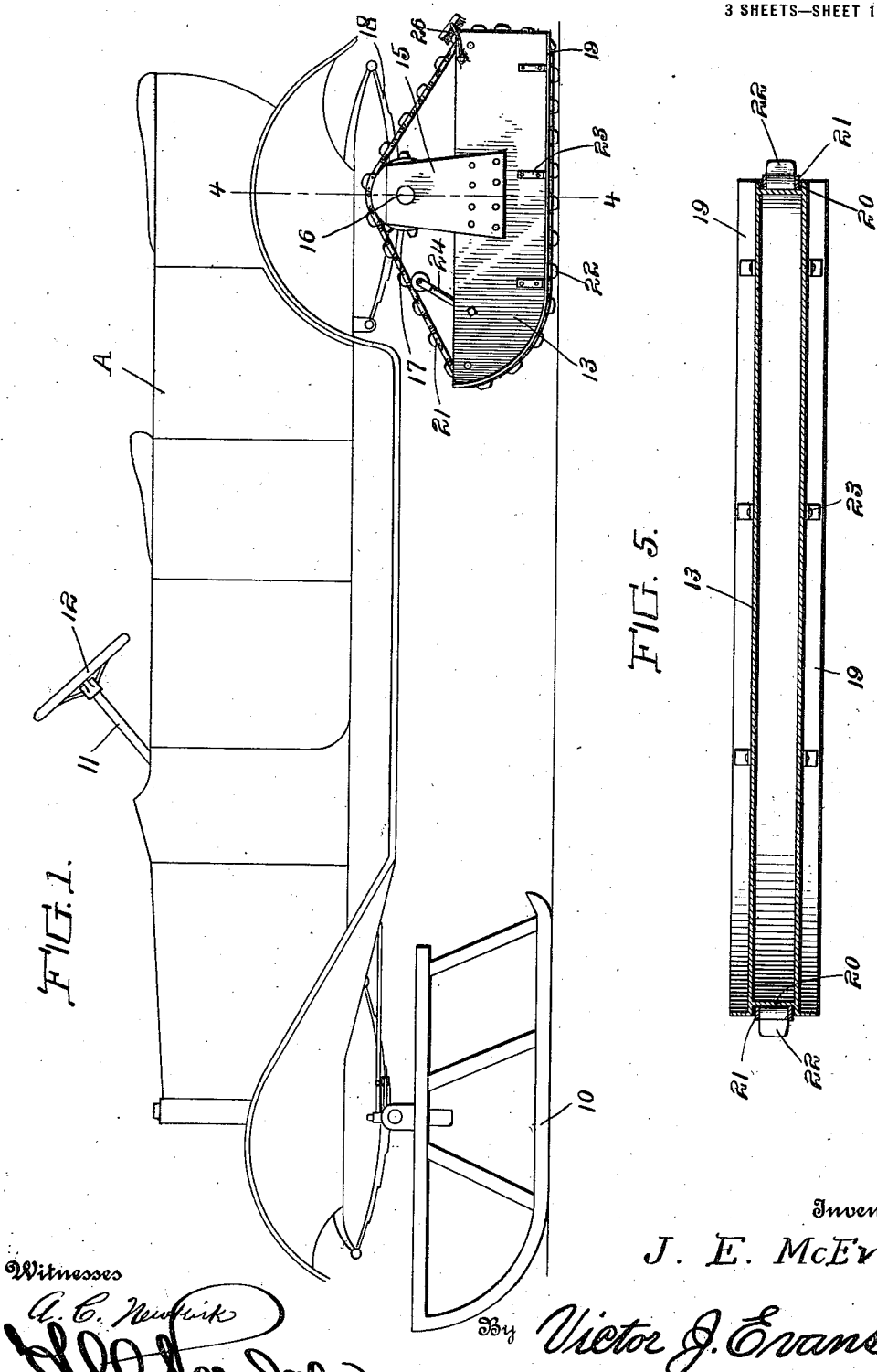

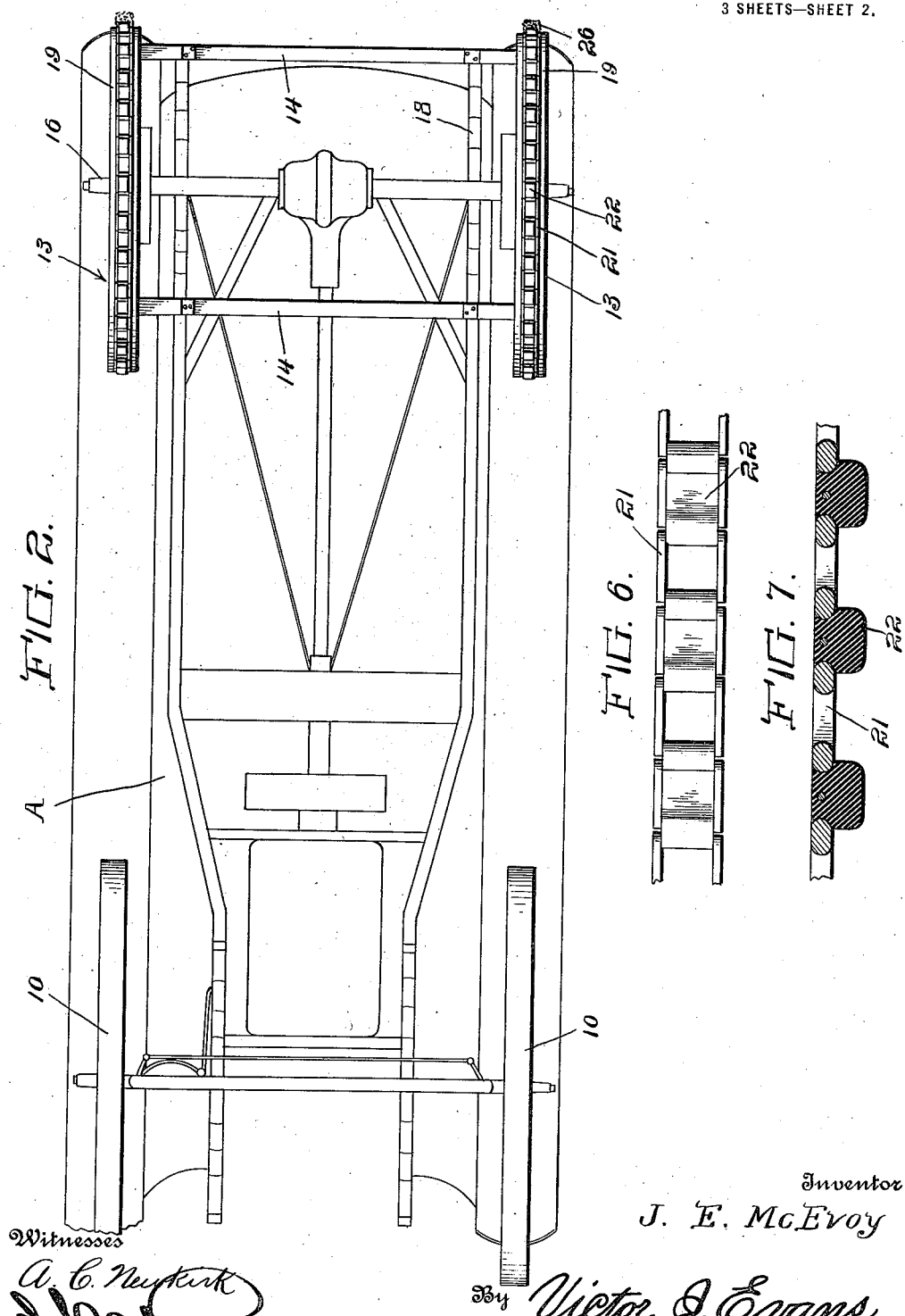

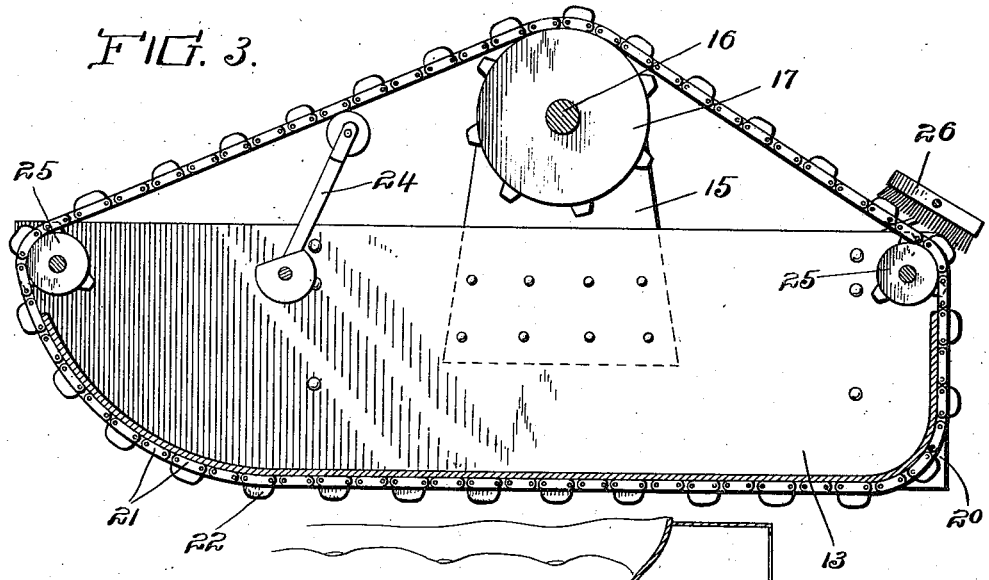
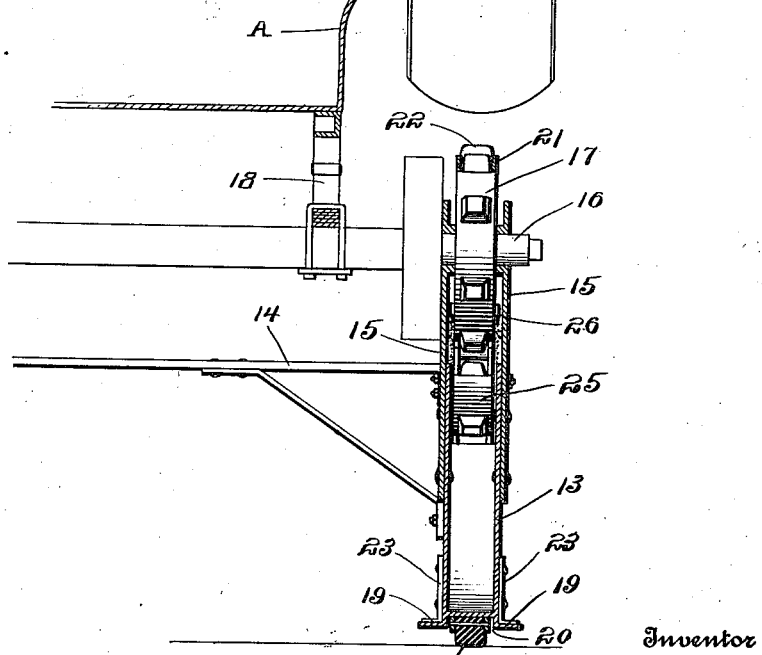

JAMES E. McEVOY, OF OSGOODE, CANADA.

MOTOR-SLEIGH.

1,279,386.   Specification of Letters Patent.   Patented Sept. 17, 1918.

Application filed February 9, 1916. Serial No. 77,203.

*To all whom it may concern:*

Be it known that I, JAMES E. McEVOY, a subject of the King of Great Britain, residing at Osgoode, in the Province of Ontario and Dominion of Canada, have invented new and useful Improvements in Motor-Sleighs, of which the following is a specification.

This invention relates to motor driven sleighs and has for its object the provision of a novel form of runner so constructed as to form a guideway for the traction chains of such design as to prevent lateral movement of the chain and to provide a bearing surface for insuring positive driving contact of the maximum length of chain.

An important object is the provision of a runner having flanges extending laterally outward from the lower edges thereof for preventing the runners from sinking too deeply into the snow or into slush and mud.

A further object of the invention is the provision of a sleigh of this character which is simple in construction, reliable in operation, strong, durable and inexpensive in manufacture.

The invention accordingly consists in the features of construction, combination of elements and arrangement of parts exemplified in the construction hereinafter described, and the scope of the application of which is defined in the claim hereunto appended.

In the accompanying drawings:

Figure 1 is a side elevation of a sleigh constructed in accordance with the invention;

Fig. 2 is a bottom plan view;

Fig. 3 is a vertical longitudinal sectional view;

Fig. 4 is a sectional view on the line 4—4 of Fig. 1;

Fig. 5 is a longitudinal horizontal sectional view through one of the runners;

Fig. 6 is a fragmentary top plan view of one of the driving chains;

Fig. 7 is a fragmentary vertical longitudinal sectional view thereof.

Similar reference characters indicate corresponding parts throughout the several views of the drawings.

Referring to the drawings in detail, A designates the body of the automobile, which may be of any well known construction, and is supported at its front with runners 10 which are mounted upon the spindles of the front axle, which spindles are operated for the guiding of the automobile through the medium of a steering column or post 11 and a hand wheel 12 mounted upon the latter in the usual well known manner, while the rear portion of the said body A is supported upon traction mechanism hereinafter fully described. The traction mechanism comprises the pair of runners 13 which are arranged in spaced parallel relation to each other and are united together through the medium of cross struts 14, each runner being provided with a vertical bearing 15 centrally thereof, in which is journaled a shaft 16, driven by a suitable motor within the body having fixed thereto sprocket wheels 17, over which are trained the endless traction chains as hereinafter fully described. Fixed to the housing of the shaft 16 are springs 18 supporting the body A as will be readily understood.

Each runner 13 comprises spaced vertical plates having the forward ends of their lower sides curved upwardly into the usual shape. The plates are connected at their front, bottom and rear sides by a plate which is spaced inwardly from the extreme edges to form a channel or guideway 20 for the reception of the drive chain, this guide plate following the contour of the forward ends of the side plates and being curved upwardly at the rear end of the bottom to extend along the rear side. The bottom and front edges of the vertical plates of the runners are provided with flanges which extend outwardly at right angles to prevent the runners from penetrating too deeply into the snow or slush and mud over which the sleigh might be driven.

It is, of course, understood that there is a pair of endless traction chains disposed in the guideways 20 and each comprising a series of pivotally connected links 21. Fixed in each alternate link of the series is a solid rubber shoe or tread block 22, while the remaining links of the series are adapted to receive the teeth of the sprocket wheel 17 so that the said chain will be driven, and these shoes or blocks contact with the surface over which the rear runners 13 travel so as to advance the sleigh.

Connected to the flanges 19 are braces 23 which serve to strengthen and reinforce the same.

Pivotally mounted upon each runner 13 and working against the chain is a chain tightener 24, while arranged in the channels 20 at the upper forward and rear corners of the runners 13 are guide sprocket wheels 25 over which the chains travel.

Resiliently supported at the rear upper corners of the rear runners 13 are brushes 26 which act upon the chains for the cleaning of the same so as to avoid the clogging of the links thereof with snow, dirt or other foreign matter. Each brush 26 is mounted for various angular adjustments so as to assure the positive action thereof upon the chains during the travel of the latter.

The formation of the runners 13 with the channels therein forms a solid bed for the traction chains and thereby presents a maximum supporting surface for carrying the load of the sleigh.

From the foregoing description, taken in connection with the accompanying drawings, the construction and operation of the sleigh will be apparent and, therefore, a more extended explanation has been omitted.

Having thus described my invention, I claim:

In a motor sleigh, a runner comprising a pair of spaced plates having their forward ends curved upwardly, flanges extending outwardly at right angles from the bottom edges thereof, and a plate disposed between and connecting said spaced plates and extending along the curved forward ends and the bottom thereof and curved upwardly at the lower rear corners thereof to extend at substantially right angles, said last named plate being disposed inwardly of the edges of said spaced plates to form a guideway adapted for the reception of a traction chain.

In testimony whereof I affix my signature in presence of two witnesses.

JAMES E. McEVOY.

Witnesses:
 PHILIP McEVOY,
 MARY A. CLELAND.